(12) United States Patent
Wang (10) Patent No.: US 10,246,867 B2
(45) Date of Patent: Apr. 2, 2019

(54) RIVER COURSE ECOLOGICAL TREATMENT SYSTEM

(71) Applicant: Thomas Wang, New Taipei (TW)

(72) Inventor: Thomas Wang, New Taipei (TW)

(*) Notice: Subject to any disclaimer, the term of this patent is extended or adjusted under 35 U.S.C. 154(b) by 0 days.

(21) Appl. No.: 15/584,575

(22) Filed: May 2, 2017

(65) Prior Publication Data

US 2018/0320356 A1 Nov. 8, 2018

(51) Int. Cl.
| | | |
|---|---|---|
| *E03F 1/00* | (2006.01) |
| *C02F 3/32* | (2006.01) |
| *B01D 24/00* | (2006.01) |
| *E02B 3/12* | (2006.01) |
| *C02F 3/06* | (2006.01) |
| *E02B 3/04* | (2006.01) |
| *E02B 3/02* | (2006.01) |
| *C02F 3/28* | (2006.01) |
| *C02F 3/30* | (2006.01) |
| *E02B 5/08* | (2006.01) |

(52) U.S. Cl.
CPC .............. *E03F 1/003* (2013.01); *B01D 23/16* (2013.01); *C02F 3/06* (2013.01); *C02F 3/2826* (2013.01); *C02F 3/302* (2013.01); *C02F 3/327* (2013.01); *E02B 3/02* (2013.01); *E02B 3/04* (2013.01); *E02B 3/12* (2013.01); *E02B 3/125* (2013.01); *E02B 5/08* (2013.01); *E03F 1/001* (2013.01)

(58) Field of Classification Search
CPC ........ C02F 3/06; C02F 3/2806; C02F 3/2826; C02F 3/301; C02F 3/327; C02F 2103/007; C02F 3/302; E02B 3/00; E02B 3/02; E02B 3/04; E02B 3/12; E02B 5/00; E02B 5/08; E03F 1/001
USPC .. 210/151, 162, 170.01, 170.03, 170.1, 602, 210/605, 615, 617, 630, 747.1, 747.5; 405/107, 118
See application file for complete search history.

(56) References Cited

U.S. PATENT DOCUMENTS

| 3,235,234 | A  | * | 2/1966 | Beaudoin | ................. | C02F 3/06 |
| | | | | | | 210/747.6 |
| 8,372,277 | B2 | * | 2/2013 | Kania | ..................... | C02F 3/327 |
| | | | | | | 210/602 |
| 8,641,893 | B2 | * | 2/2014 | Torres Junco | .......... | C02F 3/327 |
| | | | | | | 210/170.1 |

(Continued)

*Primary Examiner* — Christopher Upton
(74) *Attorney, Agent, or Firm* — Rabin & Berdo, P.C.

(57) ABSTRACT

A river course ecological treatment system for use in a river includes a plurality of plastic retaining dams disposed in the river that receive and divide the river course into sequential retaining regions arranged in a direction from upstream to downstream; a plurality of ecological biological water purification systems disposed in the sequential retaining regions and each ecological biological water purification system being located between any two adjacent plastic retaining dams of the plurality of plastic retaining dams to purify water within the sequential retaining regions and discharge purified water; and at least one damp land ecological water purification system that is disposed beside the river and that includes a rainwater channel disposed along the river; aquatic plants disposed in the rainwater channel are effective to purify water flowing within the rainwater channel; and draining vents provided in the rainwater channel that discharge purified water into the river course.

11 Claims, 5 Drawing Sheets

(56) References Cited

U.S. PATENT DOCUMENTS

| | | | | |
|---|---|---|---|---|
| 8,877,048 B1* | 11/2014 | Owings | ............... | E03F 1/002 210/170.03 |
| 2006/0104721 A1* | 5/2006 | Choi | ............... | E02B 3/00 405/118 |
| 2010/0200480 A1* | 8/2010 | Kania | ............... | C02F 3/327 210/170.03 |
| 2012/0279919 A1* | 11/2012 | Atzmon | ............... | C02F 3/06 210/150 |
| 2014/0326648 A1* | 11/2014 | Gomes De Oliveira | ............... | E02B 3/02 210/151 |
| 2016/0376181 A1* | 12/2016 | An | ............... | C02F 3/327 210/170.1 |
| 2017/0107131 A1* | 4/2017 | Li | ............... | C02F 3/327 |
| 2018/0079671 A1* | 3/2018 | Wang | ............... | C02F 3/2806 |

* cited by examiner

RIVER COURSE ECOLOGICAL TREATMENT SYSTEM

BACKGROUND OF THE INVENTION

1. Technical Field

The present invention relates to technology of river water purification and, more particularly, to a river course ecological treatment system capable of performing both step-by-step treatment and joint treatment.

2. Description of Related Art

Recent years see a rapid increase in worldwide water consumption as a result of economic development and population growth. Some places are confronted with water ecological imbalance and serious environmental issues because a huge amount of untreated sewage is discharged into rivers, which in turn results from ill-defined separation of rainwater and sewage, poor construction of sewage pipelines, and underdeveloped sewage treatment infrastructure. Therefore, improving water environment quality is a compelling, complicated, and challenging task. Conventional river course treatment techniques essentially involve: constructing water-retaining buildings, such as plastic dams and gate dams, building ecological slopes, removing sludge, deploying water and changing water, and building water treatment systems on riversides. What the techniques employ are systems which are not only single, unconnected but also destroy water ecological environment and undermine biodiversity, leading to problems: the ecological restoration takes much time, entails much work, incurs high costs, and fails to yield good results.

BRIEF SUMMARY OF THE INVENTION

In view of the aforesaid drawbacks of the prior art, the present invention provides a river course ecological treatment system to enhance the efficiency of treatment of sewage discharged into the river course and thus improve the water ecological environment of the river course.

The inventor of the present invention previously developed an ecological biological water purification system which comprises one biological water purification unit or connected biological water purification units. The ecological biological water purification system is structurally compact and easy to control, takes up just a tiny strip of land, and produces satisfactory results in terms of purification. The application of the ecological biological water purification system to river course restoration is conducive to the enhancement of treatment efficiency, ease of use, and ease of changing consumables.

In order to achieve the above and other objectives, the present invention provides a technical solution as follows: plastic retaining dams and ecological biological water purification systems, which are capable of performing step-by-step treatment, are disposed in a river course, and a damp land ecological water purification system capable of performing joint treatment is disposed on at least one side of the river course. The plastic retaining dams divide the river course into retaining regions arranged in the direction from the upstream portion to the downstream portion of the river course. The ecological biological water purification systems are disposed in the retaining regions each located between any two adjacent plastic retaining dams, respectively, to purify the water in the retaining regions. The damp land ecological water purification system comprises a rainwater channel and aquatic plants. The rainwater channel is disposed beside and along the river course and has draining vents whereby water is discharged from the rainwater channel into the river course. The aquatic plants, including submerged plants, floating plants, and emerged plants, are highly adaptive and effective in purifying sewage, so as to purify the water passing through the rainwater channel.

Preferably, two side concrete layers flank the river course, whereas a bottom concrete layer is disposed at the bottom of the river course, and a sludge-collecting gutter is disposed on the bottom concrete layer.

Preferably, the side concrete layers and the bottom concrete layer of the river course each have a thickness of at least 30 cm.

Preferably, two protective ramps flank the river course, and the damp land ecological water purification system is disposed between each said side concrete layer of the river course and a corresponding one of the protective ramps.

Preferably, the ecological biological water purification systems each have a return pipe, and the return pipes whereby water purified by the ecological biological water purification systems is returned to upstream portions of the retaining regions.

Preferably, the ecological biological water purification systems each have a transfer pipe connected to the rainwater channel. Water purified by the ecological biological water purification systems is transferred to the rainwater channel with the transfer pipes and thus supplied to the damp land ecological water purification system for purification. The water purified by the damp land ecological water purification system is discharged through the draining vents to the retaining regions located downstream.

Preferably, each ecological biological water purification system comprises one biological water purification unit or connected biological water purification units.

Preferably, the biological water purification unit comprises a tank which has an inlet and an outlet. The tank has therein a sedimentation basin, an anaerobic lagoon, an oxygen-deficient pool, a primary biological sand filter and a secondary biological sand filter which are arranged in sequence. The sedimentation basin is connected to the inlet. The secondary biological sand filter is connected to the outlet. A baffle and a communication opening are disposed between the sedimentation basin and the anaerobic lagoon, between the anaerobic lagoon and the oxygen-deficient pool, between the oxygen-deficient pool and the primary biological sand filter, and between the primary biological sand filter and the secondary biological sand filter. The baffles alternate with the communication openings vertically.

Preferably, the plastic retaining dams are arranged at an interval of 1-5 km.

Preferably, the aquatic plants of the damp land ecological water purification systems are disposed in the rainwater channel through floating boards.

The techniques employed to effectuate the river course ecological treatment system of the present invention are as follows:

1) Plastic retaining dams are equidistantly disposed along the river course in the direction of the water flow in accordance with the length of the river course and the amount of water in the river course. The ecological biological water purification systems are disposed between the plastic retaining dam and the plastic retaining dam and positioned proximate to the downstream plastic retaining dams to perform step-by-step treatment. Upon its entry into the ecological biological water purification systems, sewage is treated by microorganism, and then the treated sewage enters the damp land ecological water purification systems.

2) The damp land ecological water purification system is disposed between the side concrete layer and the protective ramp. The damp land ecological water purification system comprises the rainwater channel and the aquatic plants. The aquatic plants are fixed in position inside the rainwater channel through floating boards. Water treated by the ecological biological water purification systems is introduced into the rainwater channel and further degraded by the aquatic plants. Furthermore, the water thus treated and degraded can absorb nutrients from the untreated water and then enter the downstream retaining regions, so as to be purified by the downstream ecological biological water purification systems by undergoing joint treatment alternately and in turns. A sewage channel is disposed below the damp land ecological water purification systems. Waste water and sewage (to be discharged into the river course) is collected from the surroundings by the sewage channel and delivered to a nearby sewage treatment plant. After being treated satisfactorily by the sewage treatment plant, the water is discharged into the river course.

3) The side concrete layers flank the river course. The bottom concrete layer is disposed at the bottom of the river course. The sludge-collecting gutter is disposed on the bottom concrete layer; by sedimentation, sludge enters the sludge-collecting gutter gradually and thus is timely removed.

The advantages of the river course ecological treatment system of the present invention are as follows:

1. According to the present invention, plastic retaining dams and ecological biological water purification systems are disposed in the river course to not only store water conveniently, but also allow dedicated water purification systems to be disposed between any two adjacent plastic retaining dams. The water purification systems are connected to the damp land ecological water purification systems which flank the river course. Sewage is further purified by aquatic plants to enhance self-purification capability of water. The river course ecological treatment system of the present invention effectuates step-by-step treatment and joint treatment concurrently, enhances sewage purification efficiency, reduces treatment cycle, simplifies the process flow of operation, cuts costs, and significantly improves the water ecological environment of the river course.

2. According to the present invention, the sewage is discharged into the sewage channel and then into a sewage treatment plant for undergoing purification treatment, thereby reducing secondary contamination which might otherwise be caused by direct drainage of the sewage into the river course. The water in the rainwater channel is treated in the damp land ecological water purification systems and then discharged into the river course, so as to markedly reduce the difficulty in treating sewage at a later stage, and cut treatment costs. Furthermore, the aquatic plants look attractive and thus efficiently beautify the river course and it banks, improving the ecological effect of the river course greatly.

3. According to the present invention, the aquatic plants can be changed properly in accordance with local climate and water pollutants to render the surroundings of the river course attractive and the sewage purification efficient.

4. The present invention is effective in reducing the amount of sludge produced and eliminating any foul odor generated from the sludge accumulated at the bottom of the river course. The present invention is also effective in removing sludge from the sludge-collecting gutter regularly by a step-by-step water rinsing process, performed at any time, thoroughly, and at low costs.

DETAILED DESCRIPTION OF THE EMBODIMENT OF THE INVENTION

Referring to FIG. 1 through FIG. 5, the present invention provides, in a preferred embodiment thereof, a river course ecological treatment system for use with a river course 10. The river course 10 is flanked by two protective ramps 60. In this embodiment, the river course ecological treatment system essentially comprises a plurality of plastic retaining dams 20, a plurality of ecological biological water purification systems 30 and two damp land ecological water purification systems 40.

Figure 1:
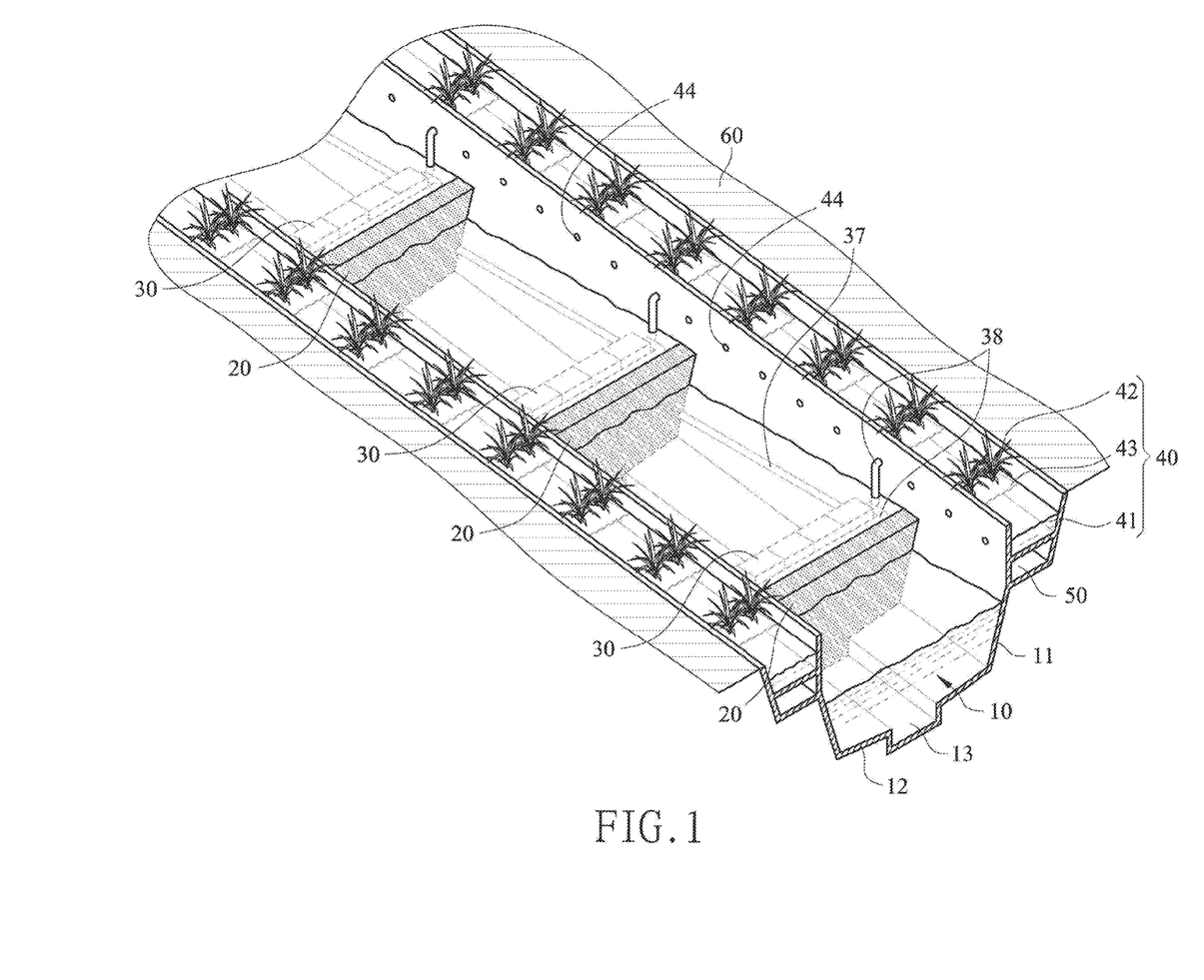
FIG. 1 is a perspective view of a river course ecological treatment system according to a preferred embodiment of the present invention.
Figure 2:
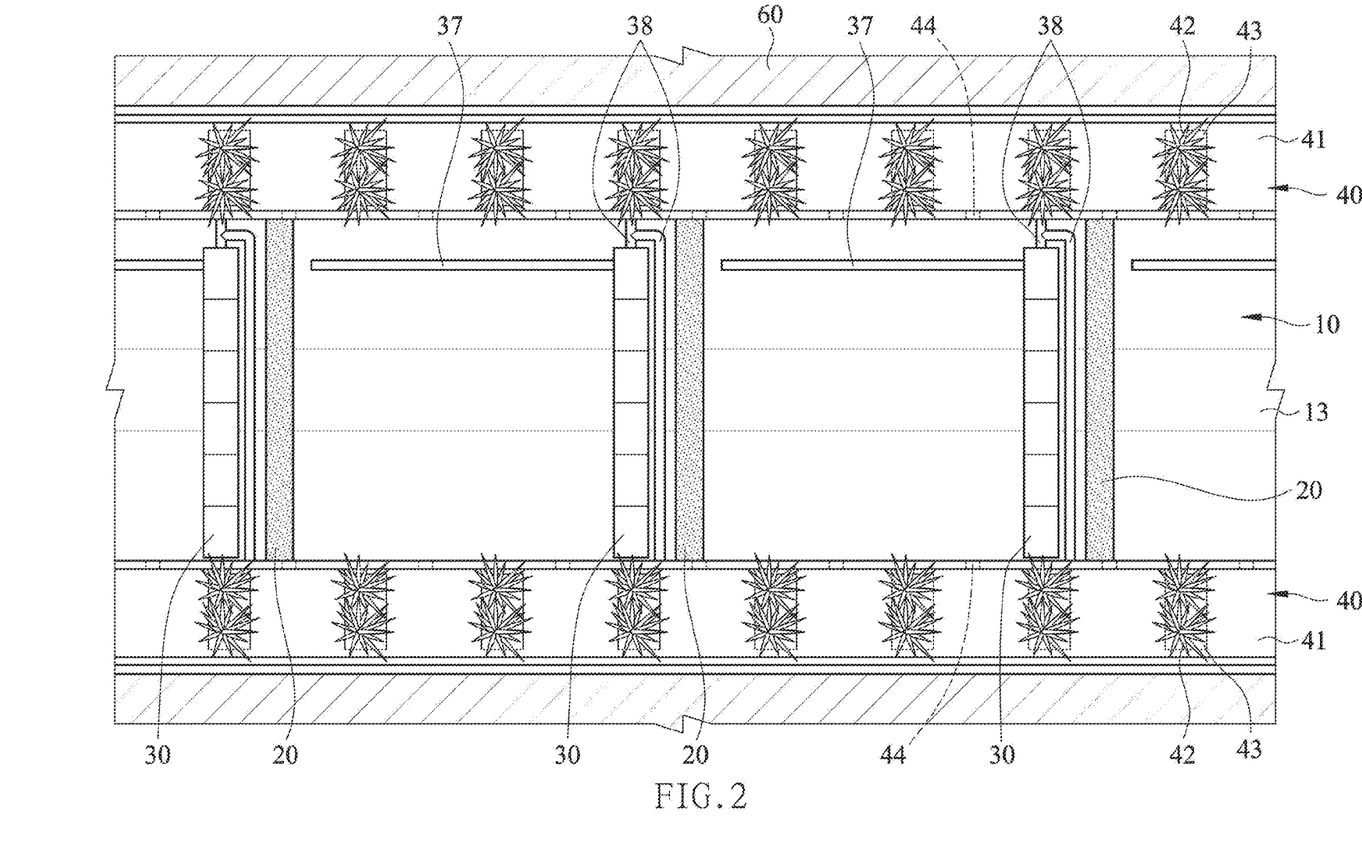
FIG. 2 is a plan of the river course ecological treatment system according to the preferred embodiment of the present invention.

The plastic retaining dams 20 and the ecological biological water purification systems 30 are disposed in the river course 10. The plastic retaining dams 20 are arranged at an interval of 1-5 km in accordance with the length of the river course 10 and the amount of water in the river course 10 to divide the river course 10 into retaining regions arranged in the direction from the upstream portion to the downstream portion of the river course 10. The ecological biological water purification systems 30 are disposed in the retaining regions each located between any two adjacent plastic retaining dams 20 and positioned proximate to the downstream plastic retaining dams 20 to purify the water in the retaining regions, thereby effectuating step-by-step treatment.

Figure 3:
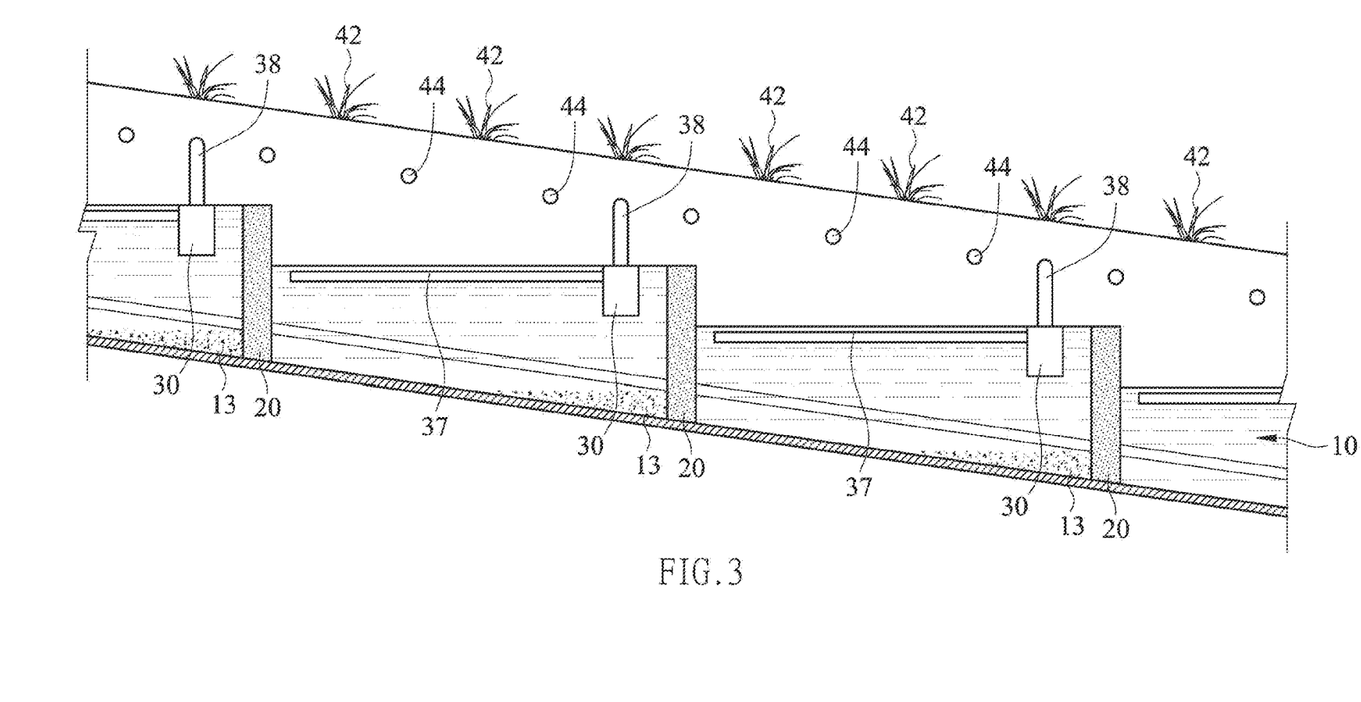
FIG. 3 is a lateral cross-sectional view of the river course ecological treatment system according to the preferred embodiment of the present invention.
Figure 4:
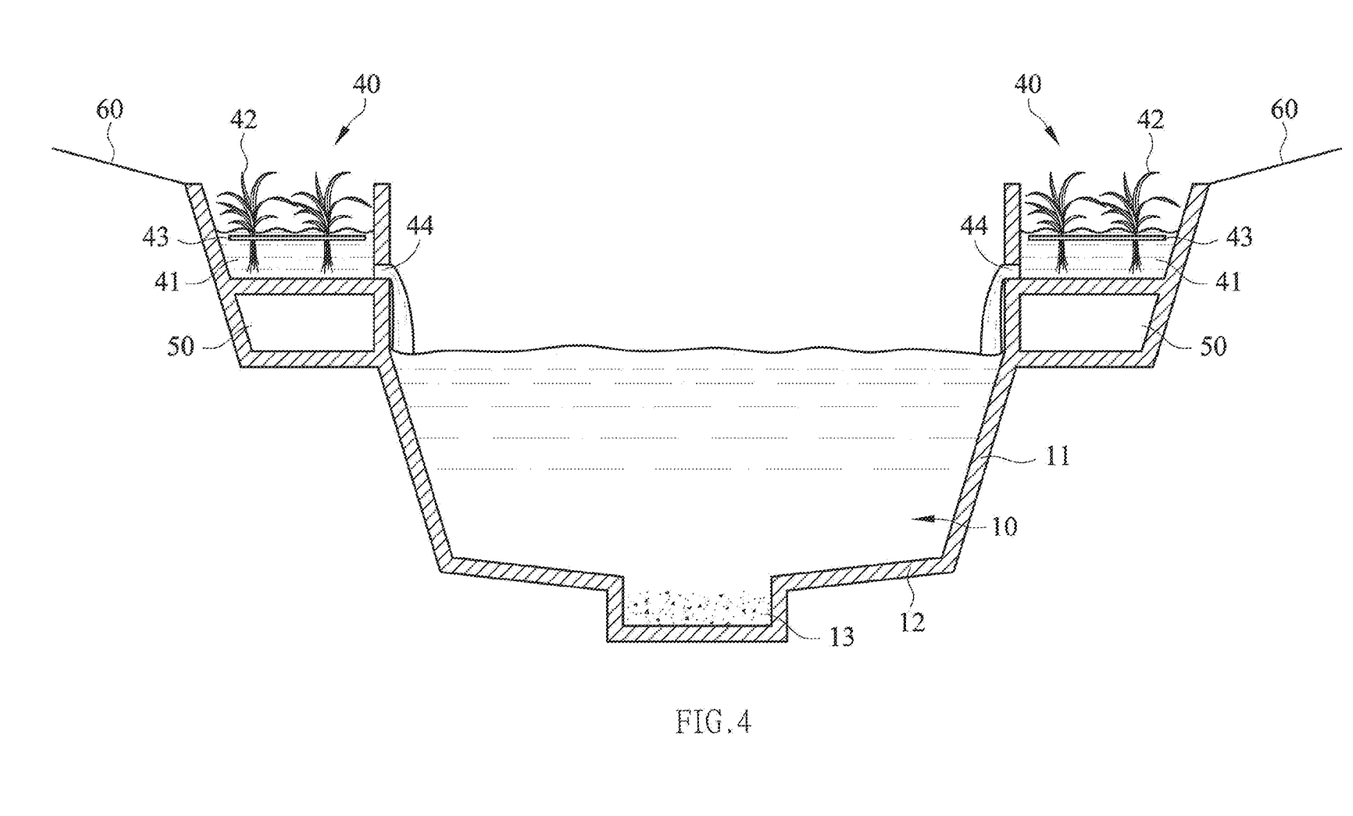
FIG. 4 is a front cross-sectional view of the river course ecological treatment system according to the preferred embodiment of the present invention.

In this embodiment, two side concrete layers 11 flank the river course 10, whereas a bottom concrete layer 12 is disposed at the bottom of the river course 10. The side concrete layers 11 and the bottom concrete layer 12 each have a thickness of at least 30 cm to prevent sewage infiltration which might otherwise lead to contamination of the surrounds. A sludge-collecting gutter 13 is disposed on the bottom concrete layer 12 so that, by sedimentation, sludge enters the sludge-collecting gutter gradually and thus is timely removed.

The damp land ecological water purification systems 40 flank the river course 10. In general, the damp land ecological water purification systems 40 are located between the protective ramp 60 and the side concrete layer 11 of the river course 10. The damp land ecological water purification systems 40 each comprise a rainwater channel 41 and aquatic plants 42. The rainwater channel 41 is disposed along the river course 10 and has draining vents 44, The draining vents 44 come in various configurations as needed, such as holes or notches, to allow water to be discharged from the rainwater channel 41 into the river course 10. The aquatic plants 42, including submerged plants, floating plants, and emerged plants, are highly adaptive and effective in purifying sewage, so as to purify the water passing through the rainwater channel 41 which floating boards 43 are disposed in.

In this embodiment, the ecological biological water purification systems 30 each have a return pipe 37 and a transfer pipe 38. With the return pipe 37 and the transfer pipe 38, water purified by the ecological biological water purification systems 30 is discharged to a predetermined location. 70% of the purified water is returned via the return pipes 37 to the upstream retaining regions. 30% of the purified water is transferred by the transfer pipes 38 to the rainwater channel 41 so as to be purified by the damp land ecological water purification systems 40 and then discharged into the downstream retaining regions through the draining vents 44 of the rainwater channel 41, thereby effectuating joint treatment.

Figure 5:
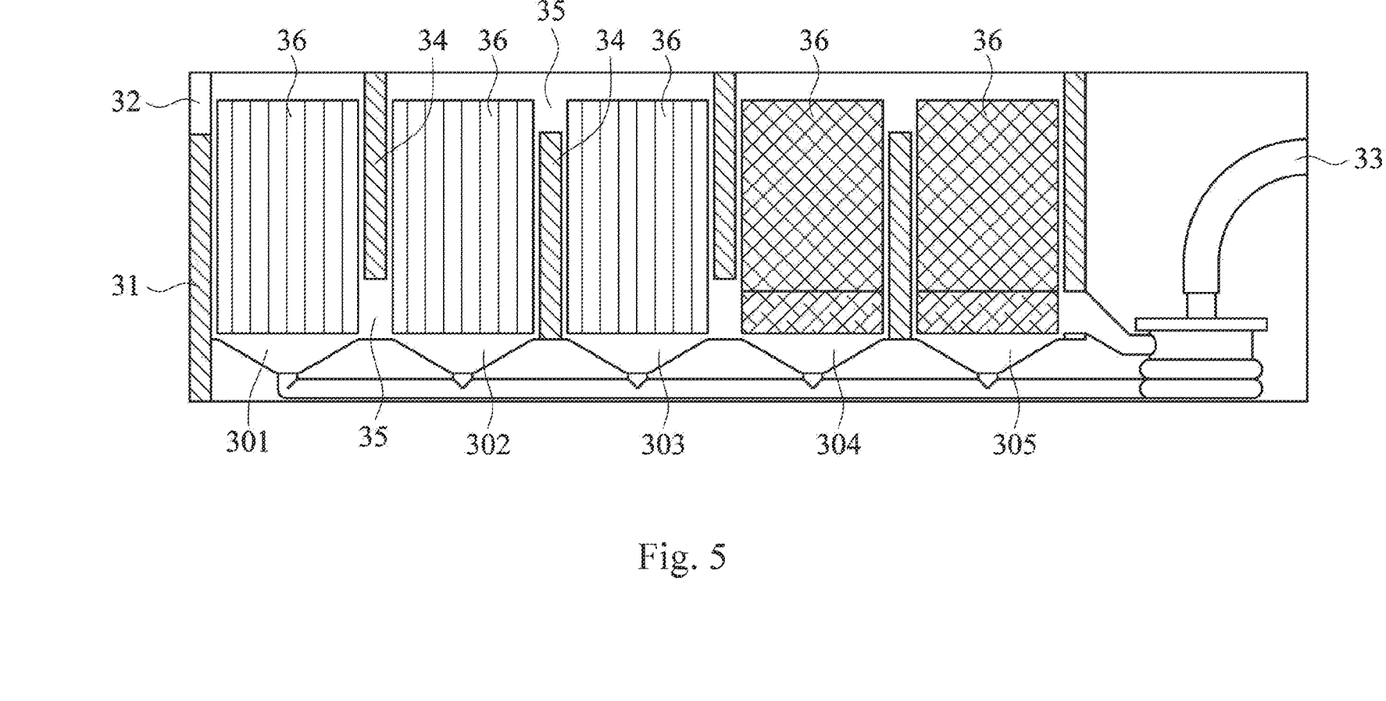
FIG. 5 is a schematic view of a biological water purification unit according to the preferred embodiment of the present invention.

The ecological biological water purification systems 30 each comprise one biological water purification unit or connected biological water purification units. The at least one biological water purification unit each comprises a tank 31 with an inlet 32 and an outlet 33. The tank 31 has therein water purification basins. The water purification basins each have a sedimentation basin 301, an anaerobic lagoon 302, an oxygen-deficient pool 303, a primary biological sand filter 304 and a secondary biological sand filter 305 which are arranged in sequence. The sedimentation basin 301 is connected to the inlet 32. The secondary biological sand filter 305 is connected to the outlet 33. A baffle 34 and a communication opening 35 are disposed between the sedimentation basin 301 and the anaerobic lagoon 302, between the anaerobic lagoon 302 and the oxygen-deficient pool 303, between the oxygen-deficient pool 303 and the primary biological sand filter 304, and between the primary biological sand filter 304 and the secondary biological sand filter 305. The baffles 34 alternate with the communication openings 35 vertically. A water purification filler 36 which is easy to change is disposed in each water purification basin. The water purification filler 36 for use with the sedimentation basin 301, the anaerobic lagoon 302 and the oxygen-deficient pool 303 is a suspended plastic elastic filler. The water purification filler 36 for use with the primary biological sand filter 304 is a fibrous filament netting filler. The water purification filler 36 for use with the secondary biological sand filter 305 is a biochemical ceramic ring-like filler.

Water purification effectuated by biological water purification units involves performing coarse filtration in the sedimentation basin 301 to remove suspended matter and large particles from the sewage, performing fine filtration in the anaerobic lagoon 302 to remove fine particles from the sewage, release phosphorus from the sewage, and reduce COD, BOD and ammonia nitrogen concentration in the water through dissolution of organic matters by microorganism, performing micro filtration in the oxygen-deficient pool 303 to remove part of the nitrogen in the sewage when denitrifying bacteria use organic matter in the sewage as a carbon source, and allowing the sewage to enter the primary biological sand filter 304, wherein the fibrous filament netting filler serves as a habitat for denitrifying bacteria. Most of COD, BOD and part of ammonia nitrogen is removed by the interaction between microorganism attached to the filler and microorganism moving around in the sewage. Finally, the sewage enters the secondary biological sand filter 305, wherein the biochemical ceramic ring-like filler has a large specific surface area, a large porosity, satisfactory chemical and physical stability which are conducive to massive reproduction of microorganism, so as to nitrify the ammonia nitrogen in the sewage completely, further degrade COD, BOD, and remove phosphorus from the sewage, thereby purifying the sewage satisfactorily.

In this embodiment, treatment techniques derived from the river course ecological treatment system are as follows:

1) the plastic retaining dams 20 are equidistantly disposed in the river course 10 and arranged in the direction of the water flow in accordance with the length of the river course 10 and the amount of water in the river course 10; and the ecological biological water purification systems 30 are disposed between the plastic retaining dams 20 located downstream to effectuate step-by-step treatment; after entering the ecological biological water purification systems 30, sewage is treated by microorganism; then, the treated sewage enters the damp land ecological water purification systems 40; the plastic retaining dams 20 are arranged at an interval of 1-5 km, whereas the ecological biological water purification systems 30 each comprise one biological treatment unit or connected biological treatment units.

2) The damp land ecological water purification systems 40 are disposed between the protective ramp 60 and the side concrete layer 11 of the river course 10; the damp land ecological water purification systems 40 each essentially comprise a rainwater channel 41 and aquatic plants 42; the aquatic plants 42 are fixed inside the rainwater channel 41 through the floating boards 43; the treated water enters the rainwater channel 41 so as to be further degraded by the aquatic plants 42 and have its nutrient taken in by the aquatic plants 42; afterward, the water enters the retaining regions located downstream so as to be purified by the ecological biological water purification systems 30 located downstream, effectuating joint treatment. A sewage channel 50 is disposed below the damp land ecological water purification systems 40. The sewage to be discharged into the river course 10 is collected by the sewage channel 50 and then delivered to a nearby sewage treatment plant for undergoing purification treatment. Finally, satisfactorily purified water is discharged into the river course 10.

3) The two side concrete layers 11 flank the river course 10. The bottom concrete layer 12 is disposed at the bottom of the river course 10. The sludge-collecting gutter 13 is disposed on the bottom concrete layer 12. By sedimentation, sludge enters the sludge-collecting gutter 13 gradually and thus is timely removed. The side concrete layers 12 and the bottom concrete layer 13 each have a thickness of at least 30 cm.

Given the framework of this embodiment, in practice, a specific percentage of the water flowing downstream along the river course 10 and passing through the retaining regions therein is purified by the ecological biological water purification systems 30. The return pipes 37 of the ecological biological water purification systems 30 returns 70% of the purified water to the retaining regions located upstream to thereby increase the chance of purifying the water repeatedly, so as to further increase the percentage by which water passing through the retaining regions is purified. The transfer pipes 38 of the ecological biological water purification systems 30 transfer 30% of the purified water to the rainwater channels 41 of the damp land ecological water purification systems 40 to control the flow rate appropriately so that the water in the rainwater channels 41 is purified by the aquatic plants 42 and then returns to the next retaining region of the river course 10 via the draining vents 44. Due to the aforesaid water purification process, the water flowing along the river course 10 undergo as many instances of various purification processes as possible, thereby providing a water ecological treatment system capable of effectuating high-efficiency restoration of the river course 10.

The present invention is disclosed above by preferred embodiments. However, persons skilled in the art should understand that the preferred embodiments are illustrative of the present invention only, but should not be interpreted as restrictive of the scope of the present invention. Hence, all variations, modifications, changes, and equivalent replacements made to the aforesaid embodiments in accordance with the technical concepts embodied in the present invention should fall within the scope of the present invention. Accordingly, the legal protection for the present invention should be defined by the appended claims.

What is claimed is:

1. A river course ecological treatment system for use in a river, comprising:
    a plurality of plastic retaining dams disposed in the river that receive and divide the river course into sequential retaining regions arranged in a direction from upstream to downstream;
    a plurality of ecological biological water purification systems disposed in the river in the sequential retaining regions and each ecological biological water purification system of the plurality of ecological biological water purification systems being located between any two adjacent plastic retaining dams of the plurality of plastic retaining dams to purify water within the sequential retaining regions and discharge purified water; and
    at least one damp land ecological water purification system that is disposed beside the river and that comprises:
        a rainwater channel disposed along the river;
        aquatic plants disposed in the rainwater channel that are effective to purify water flowing within the rainwater channel; and
        draining vents provided in the rainwater channel that discharge purified water into the river course.

2. The river course ecological treatment system of claim 1, further comprising two concrete side layers that flank the river along at least a portion of the river course ecological treatment system and that are respectively connected to a bottom concrete layer that is disposed at a bottom portion of the river course between the two concrete side layers and that has defined therein a sludge-collecting gutter that is arranged in the direction from an upstream portion to a downstream portion of the river.

3. The river course ecological treatment system of claim 2, wherein the two concrete side layers and the bottom concrete layer each have a thickness of at least 30 cm.

4. The river course ecological treatment system of claim 2, further comprising two protective ramps that flank the river along at least a portion of the river course ecological treatment system and that are respectively positioned outside of a corresponding concrete side layer of the two concrete side layers
    wherein the at least one damp land ecological water purification system is disposed between one concrete side layer of the two concrete side layers and a corresponding protective ramp of the two protective ramps.

5. The river course ecological treatment system of claim 1, wherein each ecological biological water purification system of the plurality of ecological biological water purification systems has a return pipe that receives a portion of the purified water from the ecological biological water purification system and returns the purified water to a respective retaining region of the retaining regions located upstream.

6. The river course ecological treatment system of claim 1, wherein each ecological biological water purification system has a transfer pipe connected to the rainwater channel, and water purified by each ecological biological water purification system is transferred to the rainwater channel via the transfer pipe and is supplied to the at least one damp land ecological water purification system for purification so that the water purified by the at least one damp land ecological water purification system is discharged through the draining vents into the retaining regions located downstream.

7. The river course ecological treatment system of claim 6, wherein each ecological biological water purification system comprises one biological water purification unit or a plurality of biological water purification units that are connected to one another respectively.

8. The river course ecological treatment system of claim 7, wherein each biological water purification unit comprises a tank provided with an inlet and an outlet, and the tank has disposed therein at least one water purification basin comprising, in the order recited, a sedimentation basin, an anaerobic lagoon, an oxygen-deficient pool, a primary biological sand filter, and a secondary biological sand-filter,
    wherein the sedimentation basin is connected to the inlet, and the secondary biological sand filter is connected to the outlet,
    wherein a baffle and a communication opening are vertically disposed above one another between the sedimentation basin and the anaerobic lagoon, between the anaerobic lagoon and the oxygen-deficient pool, between the oxygen-deficient pool and the primary biological sand filter, and between the primary biological sand filter and the secondary biological sand filter, and arranged to vertically alternate orientation of a respective baffle and communication opening with respect to an adjacent baffle and communication opening.

9. The river course ecological treatment system of claim 8, wherein the plurality of plastic retaining dams are arranged at an interval of 1-5 km therebetween.

10. The river course ecological treatment system of claim 9, wherein the aquatic plants of the damp land ecological water purification systems are disposed in the rainwater channel on floating boards configured for growth of the plants therethrough.

11. The river course ecological treatment system of claim 8,
    wherein the sedimentation basin, the anaerobic lagoon, and the oxygen-deficient pool of each water purification basin are each provided with a removable water purification filler that is a suspended plastic elastic filler,
    wherein the primary biological sand filter is provided with sand and a removable water purification filler that is a fibrous filament netting filler, and
    wherein the secondary biological sand filter is provided with sand and a removable water purification filler that is a biochemical ceramic ring-like filler.

* * * * *